United States Patent [19]

Itoh et al.

[11] Patent Number: 4,745,144

[45] Date of Patent: May 17, 1988

[54] SILICONE RUBBER COMPOSITION RESISTANT AGAINST DYNAMIC FATIGUE

[75] Inventors: Kunio Itoh; Kiyoshi Imai; Takeshi Fukuda, all of Annaka, Japan; Nobuyuki Uesugi, Pasadena, Calif.

[73] Assignee: Shin-Etsu Chemical Co., Ltd., Tokyo, Japan

[21] Appl. No.: 899,044

[22] Filed: Aug. 14, 1986

[30] Foreign Application Priority Data

Aug. 16, 1985 [JP] Japan .................................. 60-180347

[51] Int. Cl.$^4$ ................................................ C08K 5/53
[52] U.S. Cl. .................................... 524/123; 524/124; 524/125; 524/139; 524/140; 524/141; 524/147; 524/148; 524/588; 524/153; 528/23; 528/24
[58] Field of Search ................. 528/23, 24; 524/588, 524/140, 139, 141, 147, 148, 153, 123, 124, 125

[56] References Cited

U.S. PATENT DOCUMENTS

| | | | |
|---|---|---|---|
| 3,997,505 | 12/1976 | Albright | 524/118 |
| 4,110,300 | 8/1978 | Matsushita | 524/424 |
| 4,433,096 | 2/1984 | Bokerman et al. | 524/862 |
| 4,433,127 | 2/1984 | Sugiyama et al. | 528/17 |

Primary Examiner—Melvyn I. Marquis
Attorney, Agent, or Firm—Hopgood, Calimafde, Kalil, Blaustein & Judlowe

[57] ABSTRACT

The silicone rubber composition comprises, in addition to the conventional ingredients of a high-polymeric diorganopolysiloxane and a reinforcing silica filler, a specific phosphorus-containing organic compound, such as phosphinates, phosphonates and phosphates, in a limited amount. By virtue of this unique ingredient, the composition can give a cured silicone rubber product having greatly improved resistance against dynamic fatigue.

7 Claims, No Drawings

SILICONE RUBBER COMPOSITION RESISTANT AGAINST DYNAMIC FATIGUE

BACKGROUND OF THE INVENTION

The present invention relates to a silicone rubber composition or, more particularly, to a silicone rubber composition capable of giving a cured silicone rubber article having excellent durability and resistance against dynamic fatigue when used in a dynamic application such as rubber contacts, synchronized joint-cover boots of automobiles, diaphragms, medical pumping tubes and the like.

As is well known, silicone rubbers are used in a wide variety of applications including the fields of electric and electronic parts, office machines, automobiles, aircrafts, foods and medical technology, industries in general, equipments for leisure time amusement and so on by virtue of the excellent properties inherent in them. Needless to say, even the silicone rubbers are not almighty and have several problems and disadvantages. One of the problems in silicone rubbers is the relatively low resistance against dynamic fatigue which limits the durability or serviceable life of silicone rubber-made bodies used in dynamic applications such as rubber contact members used in pocketable electronic calculators, push button-operated telephones, etc., synchronized joint covering boots for automobiles, diaphragms, medical pumping tubes and so on.

In connection with improvements of the characteristics of silicone rubbers used in such a dynamic application relative to the resistance against dynamic fatigue, it is generally accepted that several means effective in ordinary synthetic rubbers, e.g. uniformization of crosslinking, low crosslinking density, low elastic modulus formulation, low filler loading, uniformity in filler dispersion, removal of coarser filler particles and so on, are also effective in silicone rubbers and some of them are practiced in certain cases. Even the silicone rubber composition in which these conventional means of improvement have been undertaken is not so satisfactory as desired to give a cured silicone rubber body and the fatigue characteristics by extension and bending can rarely exceed a million times by the most popular testing method of de Mattia for fatigue so that it is eagerly desired to develop a silicone rubber composition capable of giving a cured silicone rubber body having further improved resistance against dynamic fatigue.

SUMMARY OF THE INVENTION

Thus, the silicone rubber composition of the invention capable of giving a cured silicone rubber body improved in respect of the resistance against dynamic fatigue comprises:

(a) 100 parts by weight of an organopolysiloxane represented by the average unit formula

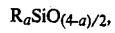

$$R_a SiO_{(4-a)/2}, \quad (I)$$

in which R is a monovalent hydrocarbon group and a is a positive number in the range from 1.90 to 2.05;

(b) from 10 to 100 parts by weight of a reinforcing silica filler having a specific surface area of at least 50 $m^2/g$; and (c) from 0.05 to 5 parts by weight of a phosphorus-containing organic compound.

DETAILED DESCRIPTION OF THE PREFERRED EMBODIMENTS

As is described above, the essential ingredients in the inventive silicone rubber composition are the organopolysiloxane as the component (a), the reinforcing silica filler as the component (b) and the phosphorus-containing organic compound as the component (c), of which the components (a) and (b) are conventional in silicone rubber compositions while the most characteristic feature of the inventive silicone rubber composition consists in the formulation of the unique component (c). Such a formulation of the silicone rubber composition is very effective to greatly improve the properties of cured silicone rubber bodies of the composition in respect of the resistance against dynamic fatigue. For example, the durability of the cured silicone rubber according to the invention using known curing catalysts or crosslinking agents may reach 5 to 20 times of that of prior art products against fatigue by extension and bending and the results of the fatigue test can exceed 10 million cycles. Further investigations for the types and amount of the phosphorus-containing organic compound have led to the completion of the present invention according to which highly durable silicone rubber products having excellent mechanical properties such as hardness, elasticity, tear strength and the like can readily be obtained with greatly increased versatility in the formulation of silicone rubber compositions.

The component (a) as the main ingredient of the inventive silicone rubber composition is an organopolysiloxane which may be any of organopolysiloxanes used in conventional room temperature-curable or heat-curable silicone rubber compositions. The organopolysiloxane should be a diorganopolysiloxane having a substantially linear molecular structure and is represented by the average unit formula (I) given above. In the formula, the symbol R denotes a monovalent hydrocarbon group exemplified by alkyl groups, e.g. methyl, ethyl, propyl and butyl groups, alkenyl groups, e.g. vinyl and allyl groups, aryl groups, e.g. phenyl and tolyl groups, and cycloalkyl groups, e.g. cyclohexyl group, as well as those substituted groups obtained by the replacement of a part or all of the hydrogen atoms in the above named hydrocarbon groups with substituent atoms and groups such as halogen atoms and cyano groups exemplified by chloromethyl, 3,3,3-trifluoropropyl and cyanomethyl groups. The subscript a is a positive number in the range from 1.90 to 2.05. The average degree of polymerization of the organopolysiloxane is not particularly limitative so that it can be in the form of a viscous fluid but should preferably have a gum-like consistency with an average degree of polymerization of 5000 or larger. The organopolysiloxane is typically a dimethylpolysiloxane, i.e. a diorganopolysiloxane of which all of the organic groups bonded to the silicon atoms are methyl, although a part of the methyl groups may be replaced with other organic groups such as phenyl and 3,3,3-trifluoropropyl groups in a molar proportion of 50% or below and vinyl groups in a molar proportion of, for example, 0.01 to 0.5%. The diorganopolysiloxane should be terminated at the molecular chain ends preferably with silanolic hydroxy groups or trialkylsilyl, e.g. trimethylsilyl, groups.

The component (b) in the inventive silicone rubber composition is a reinforcing silica filler which may be any of silica fillers conventionally used in silicone rubber compositions including fumed silica, precipitated silica, silica aerogel and the like, optionally, after hydrophobic surface treatment with an organosilane or organosilazane compound or low-molecular organopolysiloxane compound. The silica filler should have a specific surface area of at least 50 m²/g in order to fully exhibit the desired reinforcing effect.

The amount of the reinforcing silica filler should be in the range from 10 to 100 parts by weight or, preferably, from 20 to 70 parts by weight per 100 parts by weight of the organopolysiloxane as the component (a) although the amount should be selected adequately depending on the desired general properties or, in particular, on the desired degree of resistance against dynamic fatigue of the cured silicone rubber.

The component (c) is a phosphorus-containing organic compound which is essential to impart the cured silicone rubber of the inventive composition with highly improved resistance against dynamic fatigue. Suitable phosphorus-containing organic compounds include those belonging to the three classes described below.

The first class of the phosphorus-containing organic compounds includes those represented by the general formula $R^1_n PO(OR^2)_{3-n}$, in which $R^1$ and $R^2$ are each a monovalent hydrocarbon group having 1 to 10 carbon atoms selected from the class consisting of alkyl groups and aryl groups, e.g. phenyl and tolyl groups, and n is zero, 1 or 2 corresponding to a phosphate, phosphonate and phosphinate, respectively, with a part of the groups $R^1$ and $R^2$ optionally being hydrogen atoms. A variation of the phosphonate compounds includes phosphoroamidates represented by the general formula $R^1_2 NOP(OR^2)_2$, in which $R^1$ and $R^2$ each have the same meaning as defined above.

Particular examples of the above defined phosphorus-containing organic compounds of the first class include those expressed by the following formulas: $(C_4H_9O)_3PO$ and $(CH_3\!-\!C_6H_4\!-\!O)_3PO$ as the examples of the phosphate compounds; $C_6H_{13}PO(OC_4H_9)_2$ and $C_6H_5PO(OC_4H_9)_2$ as the examples of the phosphonate compounds; $(C_8H_{17})_2PO(OC_4H_9)$ as the example of the phosphinate compounds; and $(C_4H_9O)_2PONH(C_4H_9)$ and $(C_4H_9O)_2PON(C_4H_9)_2$ as the examples of the phosphoroamidate compounds.

The second class of the phosphorus-containing organic compounds includes those used as a phosphorus-containing chelate-type titanium coupling agent and represented by the general formula $X_n TiY_{4-n}$, in which n is 1 or 2, X is a group of the formula $OR^2$, $R^2$ being as defined above, when n is 1 or a divalent group of the formula

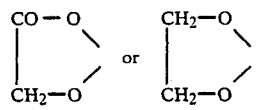

corresponding to n equal to 2, and Y is a phosphate or pyrophosphate group of the formula $\{O\!-\!PO(OR^2)_2\}_3$ or $\{O\!-\!PO(OH)\!-\!O\!-\!PO(OR^2)_2\}_3$. Alternatively, the second class of the phosphorus-containing organic compounds includes those coordination-type ones represented by the general formula $X'_4 TiZ_2$, in which $X'$ is a group of the formula $OR^3$, $R^3$ being a monovalent group selected from the class consisting of alkyl, alkenyl and aryl groups having 1 to 15 carbon atoms and 3-methacryloxypropyl group and Z is a phosphite group of the formula $(R^3O)P\!-\!OH$, $R^3$ being as defined above.

Particular examples of the above defined phosphorus-containing organic compounds of the second class include those expressed by the following formulas:

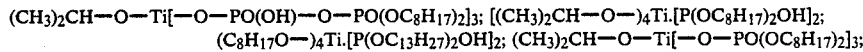

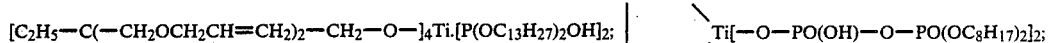

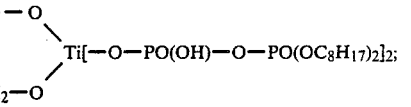

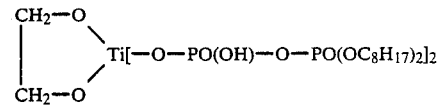

and the like.

The third class of the phosphorus-containing organic compounds as the component (c) includes those used as a phosphorus-containing silane coupling agent and represented by the general formula $(R^4O)_m Si(R^4)_{3-m}[\!-\!R^5\!-\!PO(OR^4)_2]$, in which $R^4$ is a monovalent hydrocarbon group selected from the class consisting of alkyl groups having 1 to 6 carbon atoms, cycloalkyl groups having 5 to 8 carbon atoms and aryl groups, e.g. phenyl and tolyl groups, $R^5$ is a divalent hydrocarbon group and m is 1, 2 or 3.

Particular examples of the phosphorus-containing organic compounds of the third class include those expressed by the following formulas: $(C_2H_5O)_3SiC_2H_4PO(OC_2H_5)_2$; $(C_2H_5O)_3SiC_3H_6PO(OC_2H_5)_2$; $(C_2H_5O)_2MeSiC_3H_6PO(OC_2H_5)_2$; $(C_2H_5O)Me_2SiC_3H_6PO(OC_2H_5)_2$; $(CH_3O)_3SiC_3H_6PO(OC_2H_5)_2$; $(CH_3O)_2MeSiC_3H_6PO(OC_2H_5)_2$; $(C_2H_5O)_3SiC_3H_6CH(CH_3)CH_2PO(OC_2H_5)_2$; and $(C_2H_5O)_3SiC_3H_6PO(OC_4H_9)_2$.

The amount of the above described phosphorus-containing organic groups in the inventive silicone rubber composition should be in the range from about 0.05 to about 5 parts by weight or, preferably, from 0.1 to 2 parts by weight per 100 parts by weight of the organopolysiloxane as the component (a) although the amount may depend on the content of phosphorus in the phosphorus-containing organic compound and the desired degree of improvement in the resistance of the cured silicone rubber against dynamic fatigue. When the amount thereof is too small, the desired effect of improvement cannot be obtained as a matter of course while an excessively large amount thereof, on the other hand, may have some adverse influences on the characteristic or, in particular, permanent compression set and elestic resilience of the cured products as a rubber.

The silicone rubber composition of the invention can be prepared by uniformly blending the above described components (a), (b) and (c) in the specified proportion using a suitable blending machine. It is optional that the inventive silicone rubber composition is admixed with various kinds of known additives used in conventional silicone rubber compositions including organosilane, organopolysiloxane and organosilazane compounds having silanol groups or alkoxy groups which serve as a dispersion aid of the silica filler in the matrix of the organopolysiloxane or to prevent deplastification of a once plasticized composition and metal oxides as a heat-resistance improver as well as various coloring agents, processing aids and the like.

In order to give a cured silicone rubber product, the inventive silicone rubber composition should comprise a curing agent or should be provided with a means for crosslink formation though not particularly limitative. For example, the composition is heat-curable when it is compounded with an organic peroxide. When the organopolysiloxane as the component (a) in the composition has at least two vinyl groups bonded to the silicon atoms in a molecule, the composition may be further admixed with an organohydrogenpolysiloxane as a crosslinking agent and a platinum compound as a catalyst so that the crosslinks are formed by the so-called hydrosilation between the silicon-bonded vinyl groups and the silicon-bonded hydrogen atoms as promoted by the platinum catalyst. When the organopolysiloxane as the component (a) is terminated at the molecular chain ends each with a silanolic hydroxy group, furthermore, the composition may be admixed with a trialkoxysilane compound and a condensation catalyst so that the crosslinks are formed by the condensation reaction between the terminal silanol groups and the alkoxy groups. Of the above mentioned methods for the crosslink formation, the method by the hydrosilation is less preferable because of the possible poisoning effect on the platinum catalyst by the phosphorus-containing organic compound as the component (c) and the method by an organic peroxide is preferable in respect of the practical versatility.

Various kinds of known organic peroxides can be used in this case including benzoyl peroxde, 2,4-dichlorobenzoyl peroxide, 2-chlorobenzoyl peroxide, dicumyl peroxide, 2,5-bis(tert-butyl peroxy)-2,5-hexane and the like. The amount of the organic peroxide to be added to the inventive silicone rubber composition should be in the range from 0.01 to 5 parts by weight per 100 parts by weight of the organopolysiloxane as the component (a).

The compounding work of the components (a), (b) and (c) together with other optional ingredients can be performed using a blending machine conventionally used in the compounding works of silicone rubbers such as two-roller mills, kneaders, Banbury mixers and the like and the uniformly blended composition may be subjected to a preliminary heat treatment, if necessary. The inventive silicone rubber composition can be shaped into the form of the desired cured rubber products by any known molding method such as compression molding, extrusion molding, calendering and the like followed by curing.

In the following, the inventive silicone rubber composition is illustrated in more detail by way of examples and comparative examples, in which the expression of "parts" always refers to "parts by weight" and the symbols Me, Et, Vi, Bu and Oc denote methyl, ethyl, vinyl, butyl and octyl groups, respectively.

EXAMPLES 1 TO 7 AND COMPARATIVE EXAMPLE 1

A master compound, referred to as the Compound A hereinbelow, was prepared by uniformly blending, in a two-roller mill, 100 parts of a methylvinylsiloxane gum having an average degree of polymerization of about 7000 and composed of 99.85% by moles of dimethylsiloxane units $Me_2SiO$ and 0.15% by moles of methylvinyl siloxane units MeViSiO with a dimethyl vinyl silyl group as the terminal group at each of the molecular chain ends, 30 parts of a fumed silica filler having a specific surface area of 230 $m^2/g$ and surface-blocked with trimethyl silyl groups and 1 part of a low-molecular dimethylpolysiloxane having an average degree of polymerization of about 20 and terminated at both molecular chain ends each with a silanolic hydroxy group as a dispersing aid of the silica filler.

In each of Examples 1 to 7, 100 parts of the thus prepared Compound A were admixed with one of the seven phosphorus-containing organic compounds (1) to (7), respectively, expressed by the following formulas in an amount indicated in Table 1 below.
(1) $C_6H_{13}PO(OBu)_2$
(2) $(BuO)_3PO$
(3) $(Me—C_6H_4—O)_3PO$
(4) $(EtO)_3Si—C_2H_4—POEt_2$
(5) $(Me_2CH—O)_4Ti·[P(OOc)_2OH]_2$
(6) $(OcO)_4Ti·[P(OOc)_2OH]_2$
(7) $(Me_2CH—O)Ti[—O—PO(OOc)_2]_3$
Further, each of the compositions was uniformly admixed with 0.5 part of 2,5-bis(tert-butyl peroxy)-2,5-dimethyl hexane and shaped into a cured silicone rubber sheet of 2 mm thickness by compression molding at 170° C. for 10 minutes. The procedure in Comparative Example 1 for the preparation of a cured silicone rubber sheet was substantially the same as above excepting the omission of the phosphorus-containing organic compound in the formulation.

Each of the cured silicone rubber sheets was subjected to the test of the fatigue durability by 100% extension using a de Mattia fatigue testing machine to give the results shown in Table 1.

TABLE 1

|  | Example | | | | | | | Comparative Example 1 |
| --- | --- | --- | --- | --- | --- | --- | --- | --- |
|  | 1 | 2 | 3 | 4 | 5 | 6 | 7 |  |
| Phosphorus-containing organic compound, parts | 1.0 | 0.5 | 1.0 | 1.0 | 1.0 | 1.0 | 1.0 | — |
| Fatigue durability by 100% extension, × | 680 | 830 | 680 | 550 | 550 | 850 | 640 | 150 |

TABLE 1-continued

|  | Example | | | | | | | Comparative Example 1 |
|---|---|---|---|---|---|---|---|---|
|  | 1 | 2 | 3 | 4 | 5 | 6 | 7 |  |
| $10^4$ cycles |  |  |  |  |  |  |  |  |

Separately, the silicone rubber compositions prepared in Examples 2, 4 and 7 and Comparative Example 1 after admixture of the organic peroxide were each shaped into a key-top covering for pocketable electronic calculator which was subjected to the durability test by repeatedly pushing the key at a frequency of 5 times per second until it was destroyed. The numbers of the repeated key pushing to cause destruction of the key-top covering were 21,000, 17,000, 20,000 and 2,400 times for the coverings shaped from the compositions in Examples 2, 4 and 7 and Comparative Example 1, respectively.

EXAMPLE 8 AND COMPARATIVE EXAMPLE 2

A master compound, referred to as the Compound B hereinbelow, was prepared by uniformly blending, in a two-roller mill, 90 parts of a gum-like dimethylpolysiloxane having an average degree of polymerization of about 7000 composed of dimethylsiloxane units $Me_2SiO$ alone and terminated at both molecular chain ends each with a dimethyl vinyl silyl group, 10 parts of a gum-like methyl vinyl polysiloxane having an average degree of polymerization of about 7000 composed of 97% by moles of dimethyl siloxane units $Me_2SiO$ and 3% by moles of methyl vinyl siloxane units $MeViSiO$ and terminated at both molecular chain ends each with a dimethyl vinyl silyl group, 45 parts of the same silica filler as used in the preceding examples and 2 parts of a low-molecular methyl vinyl polysiloxane having an average degree of polymerization of about 10 composed of 90% by moles of dimethyl siloxane units and 10% by moles of methyl vinyl siloxane units with a silanolic hydroxy group at each molecular chain end as a dispersing aid of the silica filler followed by a heat treatment of the blend at 180° C. for 2 hours.

Six curable silicone rubber compositions were prepared each from 100 parts of the Compound B without (Comparative Example 2) or with (Example 8) admixture of tributyl phosphate in an amount indicated in Table 2 below and with admixture of the same organic peroxide in the same amount as in the preceding examples. Each composition was shaped into a cured silicone rubber sheet in the same manner as in the preceding examples and subjected to the measurement of the hardness, permanent compression set, elastic resilience and fatigue durability by 100% extension to give the results shown in Table 2.

TABLE 2

|  | Comparative Example 2 | Example 8 | | | | |
|---|---|---|---|---|---|---|
|  |  |  |  |  |  |  |
| Tributyl phosphate, parts | — | 0.1 | 0.2 | 0.5 | 1.0 | 2.0 |
| Hardness, JIS | 58 | 59 | 58 | 57 | 57 | 54 |
| Parmanent compression set, after 2 hours at 150° C. | 22 | 24 | 27 | 30 | 36 | 41 |
| Elastic resilience | 55 | 55 | 53 | 51 | 47 | 44 |
| Fatigue durability by 100% extensions, × $10^4$cycles | 23 | 30 | 55 | 105 | 150 | 280 |

What is claimed is:
1. A silicone rubber composition which comprises:
  (a) 100 parts by weight of a substantially linear diorganopolysiloxane represented by the average unit formula

$R_aSIO_{(4-a)/2}$ in which R is an alkyl, substituted alkyl, alkenyl, substituted alkenyl, aryl, substituted aryl, cycloalkyl or substituted cycloalkyl group and a is a positive number in the range from 1.90 to 2.05;
  (b) from 10 to 100 parts by weight of a reinforcing silica filler having a specific surface area of at least 50 m²/g; and
  (c) from 0.05 to 5 parts by weight of a phosphorus-containing organic compound selected from the group consisting of phosphate, phosphonate, and phosphinate compounds.
2. The silicone rubber composition as claimed in claim 1 wherein the organopolysiloxane is a diorganopolysiloxane having an average degree of polymerization of at least 5000.
3. The silicone rubber composition as claimed in claim 1 which further comprises an organic peroxide in an amount in the range from 0.1 to 5 parts by weight per 100 parts by weight of the component (a).
4. The silicone rubber composition as claimed in claim 2 wherein substantially all of the organic groups bonded to the silicon atoms in the diorganopolysiloxane are methyl groups.
5. The silicone rubber composition as claimed in claim 2 wherein from 0.01 to 0.5% by moles of the organic groups bonded to the silicon atoms in the diorganopolysiloxane are vinyl groups, the balance of the organic groups being methyl groups.
6. A cured silicone rubber body which is a cured product of a silicone rubber composition comprising:
  (a) 100 parts by weight of a substantially linear diorganopolysiloxane represented by the average unit formula $R_aSiO_{(4-a)/2}$, in which R is an alkyl, substituted alkyl, alkenyl, substituted alkenyl, aryl, substituted aryl, cycloalkyl or substituted cycloalkyl group and a is a positive number in the range from 1.90 to 2.05;
  (b) from 10–100 parts by weight of a reinforcing silica filler having a specific surface area of at least 50 m²/g; and
  (c) from 0.05 to 5 parts by weight of a phosphorus-containing organic compound selected from the group consisting of phosphate, phosphonate, and phosphinate compounds.
7. The silicone rubber composition of claim 1 wherein from 0.1 to 2 parts by weight of the phosphorus-containing organic compound is selected from the group consisting of $(C_4H_9O)_3PO$, $(CH_2-C_6H_4-O)_3PO$, $C_6H_{13}PO(OC_4H_9)_2$, $C_6H_5PO(OC_4H_9)_2$, and $(C_8H_{17})_2PO(OC_4H_9)$.

* * * * *